Nov. 18, 1941.   H. BACH   2,263,451
SEWAGE TREATMENT
Filed Sept. 24, 1938   2 Sheets-Sheet 2
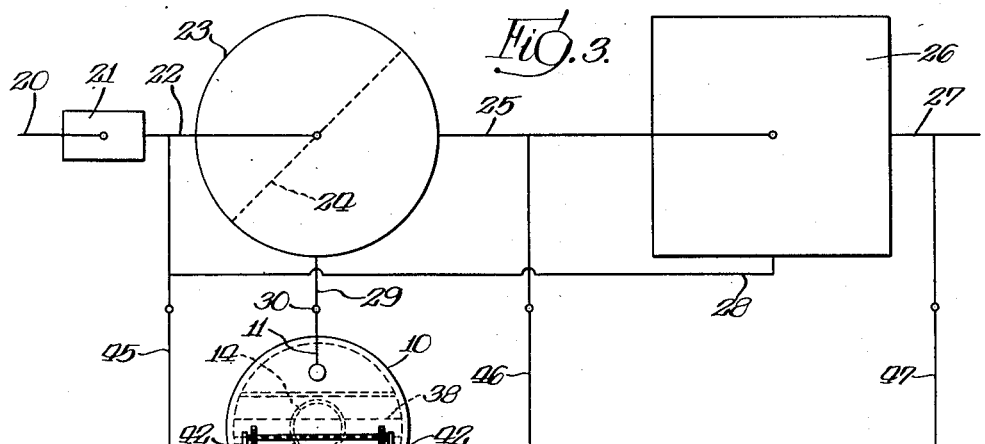
Fig. 3.
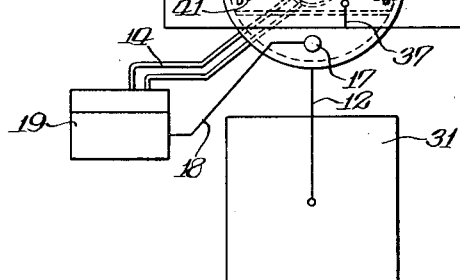
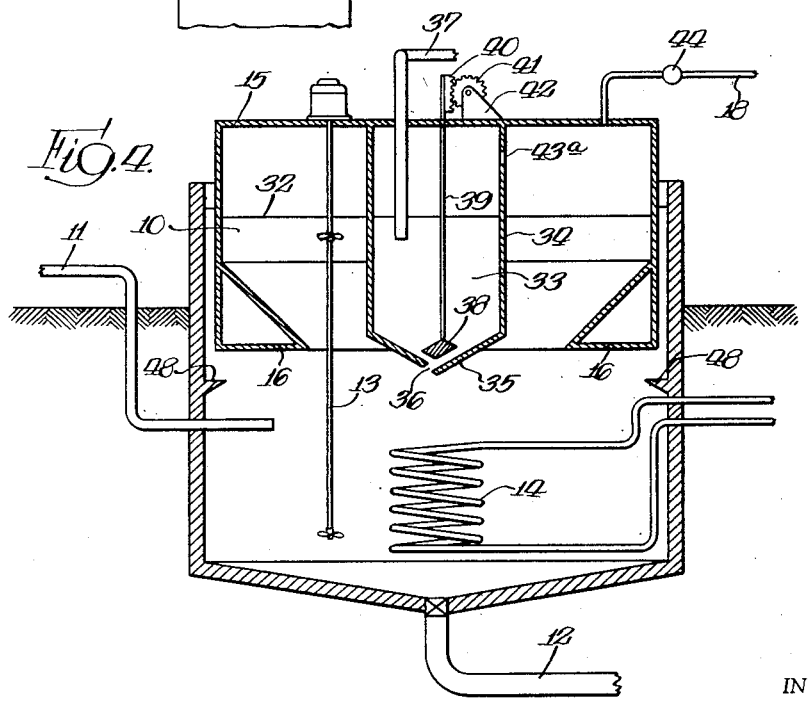
Fig. 4.
INVENTOR.
Hermann Bach Patented Nov. 18, 1941

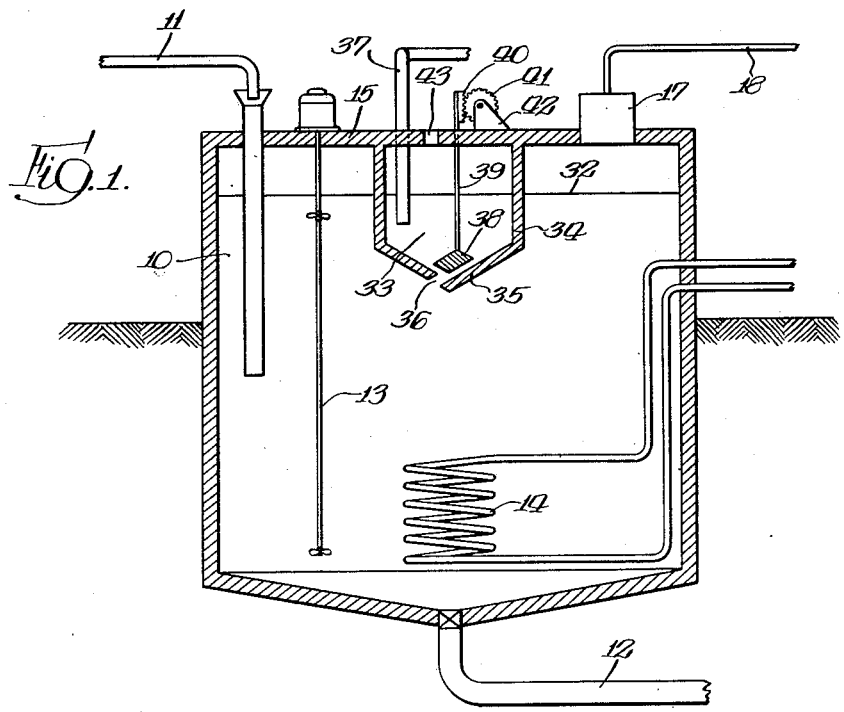
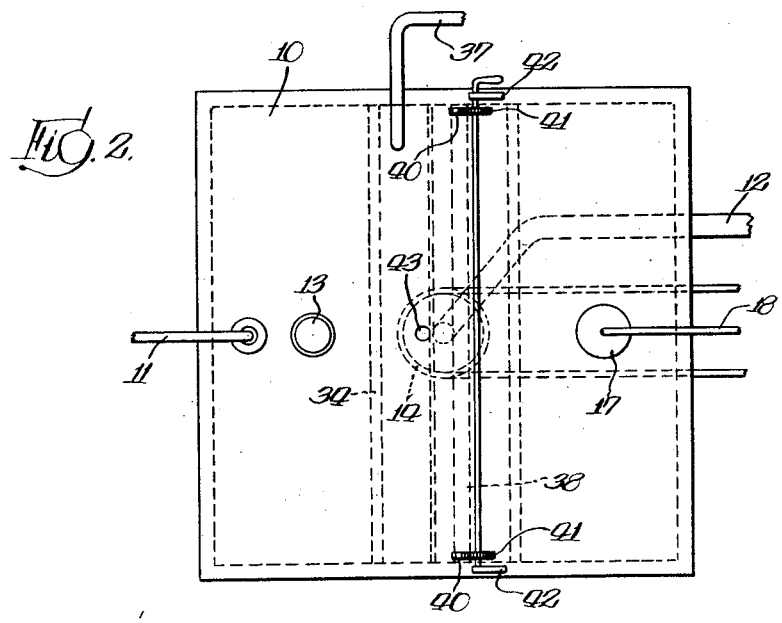

2,263,451

UNITED STATES PATENT OFFICE 2,263,451

SEWAGE TREATMENT

Hermann Bach, Berlin, Germany, assignor to International Filter Co., Chicago, Ill., a corporation of Delaware Application September 24, 1938, Serial No. 231,462
In Germany October 6, 1937

8 Claims. (Cl. 210—2)

This invention relates to the treatment of sewage, sewage sludge and similar materials, and in particular to the anaerobic digestion of such materials.

It is a general object of my invention to improve the removal and clarification of sewage sludge supernatant or the like in a treatment involving separate digestion. A particular object is to apply such improved treatment to the finely divided and slowly settling sludge particles suspended in digester supernatant liquor. Another object is to provide a separate settling space within a digester chamber, and in particular, in combination with the roof of the same, which roof may be either fixed or floating. Still another object is to provide a treating plant including such a digester chamber with supernatant settling space, and suitable devices cooperating with said digester chamber and adapted to cooperate with said settling space.

The art of constructing and operating sewage treating plants and particularly, the construction and operation of digester chambers is a highly complex field. It is impossible and unnecessary in this specification to restate all of the pertinent considerations and complications; but persons skilled in the art will be aware of the same as certain standard elements of pertinent apparatus and methods will be referred to in the following, in combination with elements which are proposed for the first time, in this connection. The advantages of the new combinations proposed will be obvious on such consideration.

In the drawings,

Fig. 1 shows one embodiment of my invention in sectional side elevation.

Fig. 2 gives a plan view of apparatus shown in Fig. 1.

Fig. 3 shows a modification in plan view of the apparatus of Fig. 1, in combination with other parts of sewage treating plant.

Fig. 4 is a further modification of apparatus shown in Fig. 1.

In the drawings, numeral 10 represents a digester tank constructed of suitable material and having any suitable shape, for instance, rectangular as shown in Fig. 2 or circular as shown in Fig. 3. Tank 10 has an inlet 11 for raw sludge or other sludge to be digested and an outlet 12 for digested sludge. Mixing and/or agitating equipment may be provided as illustrated at 13. The numeral 14 indicates a spiral of hot water pipes as an example of means for heating digester 10 or material therein or part of same, in order to provide or maintain suitable temperatures, depending on the particular digestion process desired. Cover 15 is preferably a solid, air-tight cover which may be constructed either in fixed relationship to the outer walls of digester 10 as shown in Fig. 1, or floating on material within digester 10 as for instance by means of pontoons 16 shown in Fig. 4. Cover 15 may or may not be in contact with the surface of material in digester 10 so as to submerge scum or other floating matter which may rise to the surface. Cover 15 may also carry a gas dome 17 or may otherwise provide for the withdrawal of digester gas through suitable tubing 18. Gas withdrawn through the tubing 18 may be utilized for the heating of water to be applied in pipes 14, or for other purposes, for instance by means of a burner and heater 19.

A typical sewage treating plant including digester 10 may receive raw sewage through conduit 20. The coarse matter suspended or floating in the sewage may be removed by suitable screens, girt chamber, grease separator or similar devices 21 having an effluent conduit 22 which at the same time is the influence conduit of settling or other clarifying apparatus 23 provided with suitable sludge separating equipment as diagrammatically illustrated at 24. Clarified sewage from the settling apparatus 23 ordinarily flows through a conduit 25 to a secondary treating device 26 which may be in the nature of an activated sludge plant, trickling filter, submerged filter, or any other means adapted to render the sewage inoffensive and conforming with legal and administrative standards. In some cases, suitable forms of chemical treatment may be applied either at the settler 23 or at the secondary treating device 26, or ahead of either device. In other cases, there may be no secondary treating device 26 required at all; mainly where the brook, river or lake receiving the effluent is large enough to sufficiently dilute the same so that natural purification may effectively take the place of secondary treating device 26, without damage to the river, etc. In other cases, however, some device of this sort will be required, and will have an effluent to such brook, river or lake, as indicated at 27. Certain liquid or solid products from the secondary treatment in the secondary treating device 26 may be recirculated, for instance to the clarifier inlet 22 by means of conduit 28, as is well known in this art. This will in turn have a certain effect on treatment in clarifier 23 and also on the sludge resulting from such treatment.

This sludge in most cases is intermittently withdrawn from the settler 23 through conduit 29 having a gate, valve or other controlling means 30 and communicating with digester influent 11. Sludge withdrawal may be either by means of a pump (not shown) or by gravity or the like. Digested sludge withdrawn through conduit 12 may be further treated by any appropriate device 31.

In practice, digester 10 may receive raw sludge through inlet 11 about once or twice a day. When digester 10 is filled to the limit of its capacity, by such successive or by continuous additions of raw sludge, any further charge of raw sludge requires the previous removal of a corresponding volume of material from digester 10. To some extent, digester space can be made available by withdrawal of digested sludge through conduit 12. However, such withdrawal should not be had before the sludge is fully digested, which may take a period of several days and even of several weeks. Addition of raw sludge at 11 must be had in much shorter intervals in order to keep clarifier 23 and the remainder of the plant in operable condition, and to provide for proper mixing in digester 10. Also, the amount of digested sludge to be withdrawn through conduit 12 is ordinarily much less and sometimes 8 to 12 times smaller than the volume of raw sludge received at the inlet 11, due to the fact that digested sludge is rather dehydrated and otherwise freed from substances which shall be or are incidentally separated by the processes occurring in digester 10.

Therefore, it is necessary and usual to withdraw portions of the so-called supernatant liquor from digester 10 in order to provide space for additional portions of raw sludge. Such digester supernatant is one of the products of said digester processes and is regularly found superimposed on the digester sludge which forms and tends to settle in the digester tank. Light matter such as scum or grease may float at the surface of the digester supernatant, which surface is indicated in the drawings at 32. In certain cases, it may be desirable to agitate or to break up said floating matter or scum or even to prevent the formation thereof by agitating means 13, or to similarly act upon the sludge lying in the bottom of digester 10 or to otherwise influence the processes occurring inside digester 10 in certain ways; and some such interfering methods render the supernatant in digester 10 quite turbid. Even if such artificial stirring is omitted, the supernatant will be turbid due to its inherent characteristics and also due to the fact that the natural processes occurring in digester 10 will always produce a certain amount of agitation, stirring up the sludge from the bottom and carrying down particles of floating scum, if any.

In view of this condition of the supernatant, the aforementioned usual process of supernatant withdrawal at the time of introduction of raw sludge is extremely unsatisfactory. The supernatant withdrawn is a waste product that is particularly hard to dispose of. It is possible to clarify such liquids by sedimentation, and attempts have been made to so clarify the supernatant together with the raw sewage after returning the supernatant to the main clarifier influent of a sewage treating plant. However, the solids of typical digester supernatant liquid are very finely distributed and consequently, this material requires a relatively long period of time to be clarified. The ordinary detention time afforded by the clarifiers of a sewage plant is usually too short to effect any appreciable clarification of recirculated supernatant, so that the clarifier effluent will become polluted when following this method. It has been proposed to enlarge the main clarifier receiving the digester supernatant in addition to the raw sewage, even beyond that volume which is required for the ordinary detention of the combined amounts of raw sewage and digester supernatant, so as to afford a sufficient detention time for the digester supernatant. It has also been proposed to construct a separate clarification tank for the digester supernatant, thereby producing clear liquid which may be passed through the main clarifier of the sewage treating plant only for the purpose of being exposed to secondary treatment. Apparatus constructed according to such ideas has been found expensive as to erection and operation.

I propose to provide a compartment 33 within digester tank 10, preferably formed by walls 34 of suitable shape and material depending from roof 15 and having a bottom section 35 which communicates with the outer space of digester 10. The communication may be of any suitable type, as for instance a slot 36 in the lower portion of the bottom part 35, which preferably is formed as a steep hopper. Chamber 33 has the function of providing (1) a clarification space for supernatant formed in digester 10, so that a supernatant may be available for withdrawal to the influent conduit 22, the conduit 26 from the clarifier to the secondary treating apparatus or the effluent conduit 27 which is free from the objections stated; and (2) a means for the withdrawal of supernatant portions at such times as are selected for the introduction of new charges of raw sludge from clarifier 23. Accordingly, the size of chamber 33 should be at least equal to the volume of raw sludge to be expected at each filling operation; and preferably the size, shape and construction should be such as to allow substantial clarification of such volume of supernatant within the period between any two filling operations.

Withdrawal of supernatant from chamber 33 may be had through a pipe 37 by means of a pump (not shown). In order to secure the withdrawal of clarified supernatant only, instead of a mixture of such supernatant and the turbid liquor outside of chamber 33, slot 36 is provided with a closure means illustrated by a beam 38 suspended on rods 39 which extend upwardly through cover 15 and which may have toothed rack portions 40 at their upper ends, engaging gears 41 of a winch 42 so that beam 38 may be shifted to seal the slot 36, or to allow free communication of liquid and solids through the same. Somewhat similar means are well known from certain types of settling basins, but have not to my knowledge been applied for purposes kindred to the present invention.

A vent may be provided in the chamber, as at 43 so that digester gas formed in compartment 33 may be disposed of.

In normal operation, beam 38 is spaced from slot 36 so that solids settling in compartment 33 may slide down the bottom walls 35 and through slot 36. Sediment falling through slot 36 displaces liquid in the outer space of digester 10; and such liquid will enter chamber 33, as is well known from the operation of Imhoff tanks, which in this respect are somewhat similar to the present device. Solids from digester 10 will be substantially prevented from entering with liquid entering chamber 33 due to the well known one-way effect of bottom 35 and slot 36. Therefore, the solids concentration in compartment 33 will become considerably less than in the outer digester space, and ultimately practically all the settleable sludge may be discharged from chamber 33.

If now a new charge of raw sludge from clarifier 23 shall be incorporated in the material present in digester 10, then ordinarily the winch 42 will be operated so as to seal the slot 36. An amount of supernatant corresponding to the new charge of raw sludge will then be withdrawn through pipe 37. Thereafter, winch 42 is operated so as to unseal the slot 36 again, resulting in turbid supernatant entering chamber 33 through the slot. The new charge of raw sludge is then introduced through pipe 11 and preferably mixed with the other material by operation of mechanism 13, so that more turbid supernatant will enter the chamber 33. Finally, another period of normal operation can follow.

Occasionally digested sludge will be removed through sludge outlet 12. The solids concentration in digester 10 may be higher than is ordinarily the case as the process involves the concurrent steps of clarifying and of turbulently treating sludge to be digested. Therefore, digested sludge may accumulate relatively rapidly, and the general results of the digestion process will be improved accordingly.

In continued operation, a layer of scum may tend to form on the surface of liquor in chamber 33, but the withdrawal of material through pipe 37 may be carried through so as to remove such scum; or it may be broken up by agitation.

Material withdrawn through pipe 37 may be disposed of in any suitable way, some such ways being diagrammatically illustrated by conduits 45, 46 and 47, shown in Fig. 3. Of course, provision may be made for suitable recirculation, for instance for discharging scum from the compartment 33 into digester 10 direct.

In the modification of Fig. 4 there is shown a control valve 44 cooperating with suitable pressure means (not shown) in the gas withdrawal line 18, and a gas by-pass 43a between compartment 33 and the outer space of digester 10. The valve and by-pass cooperate so as to avoid the added buoyancy of floating roof 15 which ordinarily would be experienced when chamber 33 is emptied while sealed by the beam 38. On the other hand, stops 48 are provided as a lower limit for the downward movement of cover 15.

Other modifications and amplifications will occur to persons skilled in the art. For instance, clarification in chamber 33 may be promoted by chemical means. Such modifications and amplifications are all intended to be covered by the claims which follow.

I claim:

1. Apparatus for sewage treatment comprising a clarifier, a liquid effluent conduit from the upper portion of said clarifier, means for purifying liquid effluent communicating with said effluent conduit, an anaerobic sludge digester, a sludge withdrawal conduit from the lower portion of said clarifier and communicating with said anaerobic digester, a conduit for the withdrawal of digested sludge from adjacent the bottom of said digester, partition means forming a compartment in said digester adjacent the top thereof, means for agitating sludge in an agitation zone in said digester removed from said compartment, an open communication adjacent the bottom of said compartment and opening into said zone, means for closing said open communication, and a conduit for the withdrawal of supernatant liquid from said compartment communicating with said means for purifying liquid effluent.

2. A method of sewage treatment comprising the steps of separating sludge from raw sewage in a sedimentation zone, purifying the liquid effluent from said sedimentation zone, flowing the sludge from said sedimentation zone into an anaerobic digestion zone and thereby displacing a portion of sludge in said digestion zone into a substantially enclosed anaerobic quiescent settling zone adjacent the upper level of said digestion zone, returning settled solids from said anaerobic settling zone to the said anaerobic digestion zone, removing clarified liquid from said settling zone, and removing digested sludge from said digestion zone.

3. A method of anaerobically digesting sludge comprising the steps of introducing raw sludge into an anaerobic digesting zone and thereby displacing a portion of sludge upwardly into a substantially enclosed anaerobic quiescent settling zone within the upper portion of said digesting zone, permitting the solids in said sludge in said settling zone to settle therefrom and to return to the digestion zone, periodically removing clarified supernatant liquor from said settling zone and periodically removing digested sludge from said digesting zone.

4. In the operation of a sludge digester, the method of removing solids from supernatant liquor within the upper portion of the digester, comprising the steps of non-turbulently displacing a portion of the supernatant liquor upwardly into a quiescent anaerobic settling zone within the upper portion of said digester, retaining the supernatant liquor in said zone for a period sufficient to permit solids to settle from said supernatant liquor, permitting the settled solids to descend by gravity into the digestion zone, and periodically removing the clarified supernatant liquor.

5. A sewage treatment plant comprising a clarifier, a conduit for liquid effluent from the upper portion of said clarifier, means for purifying said effluent, an anaerobic digester, a sludge conduit from the lower portion of said clarifier communicating with said anaerobic digester, partition means in said digester providing a substantially enclosed anaerobic settling compartment adjacent the top of said digester, a normally open communication between the bottom of the said settling compartment and the digester, means for closing said normally open communication, a liquid conduit from said settling compartment, a digested sludge conduit from the bottom of said digester and a gas outlet from the top of said digester.

6. In combination with an anaerobic sludge digester, partition means adjacent the top of the digester, providing a relatively large anaerobic digestion compartment and a relatively small substantially enclosed settling compartment, means for removing liquid from said settling compartment, a sloping bottom in said settling compartment provided with a normally open passage at the lower portion thereof communicating with said digestion compartment, a sludge inlet into said digestion compartment and a digested sludge outlet.

7. The apparatus of claim 6 wherein the settling compartment is provided with means for closing the normally open passage in the bottom thereof.

8. A sludge digester, comprising a tank, partition means within and adjacent the top of said tank providing a relatively large primary anaerobic digestion compartment and a relatively small substantially enclosed settling compartment superimposed over a portion of said primary compartment, means for introducing sludge into said primary compartment, an outlet from the bottom of said primary compartment, an outlet for gas from the top of said primary compartment, a normally open communication from said primary compartment into the bottom of said settling compartment and adapted to permit the flow of liquid and suspended solids into said settling compartment and to permit the gravitational discharge of the solids settling therein into said primary compartment, means for closing said communication and an outlet for liquid from said settling compartment.

HERMANN BACH.